United States Patent [19]

Pflaumer et al.

[11] Patent Number: 5,095,008
[45] Date of Patent: Mar. 10, 1992

[54] COOKIES CONTAINING PSYLLIUM

[75] Inventors: Phillip F. Pflaumer, Hamilton; Edward D. Smith, III, Cincinnati, both of Ohio; Wilbur G. Hudson, Jr., Hebron, Ky.

[73] Assignee: The Procter & Gamble Company, Cincinnati, Ohio

[21] Appl. No.: 555,328

[22] Filed: Jul. 19, 1990

Related U.S. Application Data

[62] Division of Ser. No. 96,685, Sep. 14, 1987, Pat. No. 4,950,140.

[51] Int. Cl.$^5$ .............. A21D 13/00; A21D 8/00; A61K 35/78; A61K 31/70
[52] U.S. Cl. ................................ 514/23; 514/824; 424/195.1; 424/439; 426/548; 426/804
[58] Field of Search ............. 514/23, 824; 424/439, 424/195.1; 426/548, 804

[56] References Cited

U.S. PATENT DOCUMENTS

| | | | |
|---|---|---|---|
| 2,831,854 | 4/1958 | Tucker et al. | 260/234 |
| 3,219,455 | 11/1965 | Dubois | 99/90 |
| 3,455,714 | 7/1969 | Bishop et al. | 106/205 |
| 3,579,548 | 5/1971 | Whyte | 260/410.7 |
| 3,600,186 | 8/1971 | Mattson et al. | 99/1 |
| 3,954,976 | 5/1976 | Mattson et al. | 514/23 |
| 3,963,699 | 6/1976 | Rizzi et al. | 260/234 R |
| 4,005,195 | 1/1977 | Jandacek | 514/23 |
| 4,005,196 | 1/1977 | Jandacek et al. | 514/23 |
| 4,034,083 | 7/1977 | Mattson | 514/23 |
| 4,156,021 | 5/1979 | Richardson | 426/613 |
| 4,241,054 | 12/1980 | Volpenhein et al. | 514/23 |
| 4,264,583 | 4/1981 | Jandacek | 514/182 |
| 4,321,263 | 3/1982 | Powell et al. | 424/195 |
| 4,348,379 | 9/1982 | Kowalsky et al. | 426/804 |
| 4,368,213 | 1/1983 | Hollenbach et al. | 426/590 |
| 4,382,924 | 5/1983 | Berling et al. | 514/23 |
| 4,461,782 | 7/1984 | Robbins et al. | 426/549 |
| 4,517,360 | 5/1985 | Volpenhein | 536/119 |
| 4,518,772 | 5/1985 | Volpenhein | 536/119 |
| 4,565,702 | 1/1986 | Morley et al. | 426/93 |
| 4,568,557 | 2/1986 | Becker et al. | 426/618 |
| 4,619,831 | 10/1986 | Sharma | 426/93 |
| 4,668,519 | 5/1987 | Dartey et al. | 426/94 |
| 4,668,522 | 5/1987 | Cappel et al. | 426/94 |
| 4,673,578 | 6/1987 | Becker et al. | 426/93 |
| 4,766,004 | 8/1988 | Moskowitz | 426/804 |
| 4,849,222 | 7/1989 | Broaddus | 424/195.1 |
| 4,950,140 | 8/1990 | Pflaumer et al. | 514/23 |
| 5,009,916 | 4/1991 | Colliopoulos | 424/195.1 |

FOREIGN PATENT DOCUMENTS

| | | |
|---|---|---|
| 144644 | 6/1985 | European Pat. Off. |
| 2430509 | 1/1976 | Fed. Rep. of Germany |
| 2165795 | 12/1971 | France |
| 2390961 | 12/1978 | France |
| 1590507 | 6/1981 | United Kingdom |

OTHER PUBLICATIONS

Goodman and Gilman, The Pharmacologic Basis of Therapeutics, 5th Ed. 979 (1975).
Garvin, et al., Proc. Soc. Exp. Biol. Med., 120, 744-746 (1965).
Forman, et al., Proc. Soc. Exp. Biol. Med., 127, 1060-1063 (1968).

Primary Examiner—Ronald W. Griffin
Attorney, Agent, or Firm—Kim William Zerby; Douglas C. Mohl; Ricahrd C. Witte

[57] ABSTRACT

Disclosed are cookies containing psyllium and a method for making those cookies. The cookies may additionally contain polyol polyesters. These cookies provide an effective method for introducing psyllium into the diet to treat gastrointestinal disorders, such as constipation of diarrhea, as well as a method for introducing psyllium and polyol polyesters into the diet to reduce blood cholesterol levels.

6 Claims, No Drawings

COOKIES CONTAINING PSYLLIUM

This is a division of application Ser. No. 96,685, filed on Sept. 14, 1987, now U.S. Pat. No. 4,950,140.

TECHNICAL FIELD

This invention relates to cookies containing psyllium or psyllium and polyol polyesters, as well as methods for making those cookies. These cookies provide an effective method for introducing psyllium into the diet to treat gastrointestinal disorders, such as constipation or diarrhea, as well as a method for introducing psyllium and polyol polyesters into the diet to reduce blood cholesterol levels.

BACKGROUND OF THE INVENTION

In recent years there has been increased appreciation of the benefits provided by high fiber diets. These benefits include the reduction of gastrointestinal disorders and reduction of blood cholesterol levels. High fiber intake has even been correlated with decreased incidence of certain types of cancer. Low fat diets also provide health benefits. In addition to the obvious weight control benefits, it has been recognized in recent years that a low fat diet can significantly reduce blood cholesterol levels.

High blood cholesterol (hypercholesterolemia) is a significant risk factor in cardiovascular disease. Epidemiological studies have demonstrated that, with few exceptions, populations consuming large quantities of saturated fat and cholesterol have a relatively high concentration of serum cholesterol and a high mortality rate from coronary heart disease. While it is recognized that other factors can also contribute to the development of cardiovascular disease, there appears to be a causal relationship between high concentrations of serum cholesterol (hypercholesterolemia) which results in the accumulation of cholesterol in various parts of the circulatory system (arteriosclerosis) or in soft tissues (xanthomatosis), and coronary disease and coronary mortality rates.

The art describes the use of nonabsorbable, nondigestible, polyol polyesters as cholesterol lowering agents. U.S. Pat. No. 3,954,976, Mattson, et al., issued May 4, 1976, teaches pharmaceutical compositions for inhibiting absorption of cholesterol, comprising effective unit dosage amounts of a polyol fatty acid polyester having at least four $C_8$–$C_{22}$ fatty acid ester groups. U.S. Pat. No. 4,005,195, Jandacek, issued Jan. 25, 1977, discloses anti-anal leakage agents used in combination with liquid polyol fatty acid polyesters to provide pharmaceutical and food compositions for treating and/or preventing hypercholesterolemia while avoiding undesired anal leakage of the liquid polyesters. U.S. Pat. No. 4,005,196, Jandacek et al., issued Jan. 25, 1977, discloses anti-anal leakage agents used in combination with vitamin-fortified liquid fatty acid polyester compositions for treating and/or preventing hypercholesterolemia while avoiding undesired anal leakage of the polyesters. U.S. Pat. No. 4,034,083, Mattson, issued July 5, 1977, comprises polyol fatty acid polyesters having at least four fatty acid ester groups which are fortified with fat-soluble vitamins and used in low-calorie foods and in pharmaceutical compositions for treating and/or preventing hypercholesterolemia in animals, especially humans.

Disclosures of polyol polyester compounds in food compositions include U.S. Pat. No. 3,579,548, Whyte, issued May 18, 1971, which teaches triglyceride esters of α-branched carboxylic acids, having the physical properties and utility of ordinary triglyceride fats but which are digested or absorbed to a lesser extent and are thus low calorie. These triglyceride esters are useful in making, for example, cakes. U.S. Pat. No. 3,600,186, Mattson, et al., issued Aug. 17, 1971, discloses low calorie food compositions produced by replacing at least a portion of the fat content of a conventional food with a sugar fatty acid polyester or sugar alcohol fatty acid polyester having at least 4 fatty acid ester groups with each fatty acid having from 8 to 22 carbon atoms. U.S. Pat. No. 4,368,213, Hollenbach, et al., issued Jan. 11, 1983, discloses a concentrated emulsion of non-absorbable liquid polyol polyesters and high melting fatty acids or esters thereof in water which can be diluted to a beverage. The emulsifier system comprises a polyglycerol ester and an aliphatic glycol ester. U.S. Pat. No. 4,461,782, Robbins, et al., issued July 24, 1984, discloses low calorie baked goods comprising from about 12% to about 60% of a non-absorbable, non-digestible, liquid polyol polyester, and from about 25% to about 85% microcrystalline cellulose or a mixture of microcrystalline cellulose and flour in a cellulose:flour weight ratio of at least 1:1.

Disclosures of the polyol polyester compounds in pharmaceutical compositions include U.S. Pat. No. 4,382,924, Berling, et al., issued May 10, 1983, which teaches edible compositions comprising edible oil or oil-like materials, a high potency, lipid-soluble sweetener, such as saccharin, and a lipid-soluble flavorant. These compositions are particularly useful as an oral dosage form for vitamins or pharmaceutical materials. The edible oil-like material may consist, in whole or in part, of an oily pharmaceutical agent, such as polyol fatty acid polyesters having at least four $C_8$–$C_{22}$ fatty acid ester groups. U.S. Pat. No. 4,214,054, Volpenhein, et al., issued Dec. 23, 1980, teaches the use of polyol polyesters to detoxify humans and lower animals which have ingested toxic lipophilic compounds. U.S. Pat. No. 4,264,583, Jandacek, issued Apr. 28, 1981, discloses the oral administration of polyol fatty acid polyesters to dissolve radioluscent gallstones. In this treatment regimen, the polyesters may be administered alone or, preferably, in conjunction with a litholytic bile acid.

U.S. Pat. Nos. 3,963,699, Rizzi, et al., issued June 15, 1976; 4,517,360, Volpenhein, issued May 14, 1985; and 4,518,772, Volpenhein, issued May 14, 1985, all disclose methods of synthesis for higher polyol fatty acid polyesters.

J. E. Garbin, D. T. Forman, W. R. Eiseman, and C. R. Phillips, *Proc. Soc. Exp. Biol. Med.*, 120, 744 (1965), describe the administration of psyllium (as METAMUCIL brand laxative) to human volunteers, resulting in a reduction in blood cholesterol levels. Also, see Forman, et. al., *Proc. Soc. Exp. Biol. Med.*, 127, 1060–1063 (1968).

Generally, psyllium, whether used for controlling constipation or diarrhea, or for reducing blood cholesterol levels, is introduced into the diet by dispersing it in water or an aqueous beverage which is ingested by the user.

Psyllium mucilloid contains natural mucillage and normally forms a gelatinous mass on contact with water. It also exhibits poor dispersibility and mixability in water. The numerous individual particles tend to agglomerate when psyllium mucilloid is mixed in water.

Hydration takes place over the surface of such agglomerated aggregates to form gel-coated lumps, the interiors of which are still substantially dry, and these lumps are extremely difficult to disperse. This effect is aggravated by the fact that psyllium has a tendency to float on the surface of the water, allowing partially dissolved particles to agglomerate into large masses. Such imperfect dispersions are generally not considered to be palatable. In addition, even when properly dispersed, the taste and texture of psyllium mucilloid are undesirable to many persons.

A number of methods have been suggested or obviating these problems. Historically, psyllium seed preparations have been formulated to contain equal parts of active bulk laxative and a sugar as a means of promoting dispersion. These products are undesirable to many persons because of their high sugar and calorie content.

U.S. Pat. No. 3,455,714, Bishop et al., issued July 15, 1969, discloses a method for providing water-soluble gums having improved water dispersibility comprising coating the gums with certain water-soluble cellulose ethers, water-soluble cellulose esters, and water-soluble mixed cellulose esters which do not agglomerate when added to water or have less of a tendency to agglomerate than the materials being coated therewith. U.S. Pat. No. 4,321,263, Powell et al., issued Mar. 23, 1982, discloses a method for rendering psyllium powder more easily dispersed in water by wetting the psyllium particles with an alcoholic solution of at least one polyethylene glycol and polyvinylpyrrolidone and granulating the thus-coated particles.

U.S. Pat. No. 4,565,702, Morley, et al., issued Jan. 21, 1986, teaches a dietary fiber composition prepared by coating an insoluble fiber with a soluble fiber. The insoluble fiber may be psyllium. The dietary fiber composition can be used to prepare low calorie, high fiber content dietary food products.

Finally, European Patent Application 144,644, published June 19, 1985, discloses a composition comprising from about 25% to about 100% (by weight) total dietary fiber selected from psyllium, and a grain, fruit, or vegetable source, wherein psyllium comprises from about 10% to about 80% of the fiber. The dry blend or high fiber food product base is incorporated into suitable compositions to provide a psyllium high fiber drink mix or an extruded psyllium high fiber bar or puff which may additionally contain sweeteners, flavoring agents, protein sources, surfactants, wetting agents, preservatives, and the like.

Cookies or biscuits might provide a useful way to introduce psyllium into the diet. However, attempts to incorporate psyllium into baked goods have historically met with difficulty due to the mucilaginous nature of psyllium. If the psyllium is hydrated before the compositions are baked, an undesirable product results. Not only is the product difficult to work with, but the resulting baked product has an undesirable taste and texture.

It would be most desirable to make a palatable psyllium-containing cookie in which the psyllium does not substantially hydrate during the mixing, forming, or baking process, and does not substantially hydrate in the mouth upon eating.

An object of the present invention is to provide a method for making such a psyllium-containing cookie.

A further object of the present invention is to provide a composition and method for making a palatable psyllium- and polyol polyester-containing cookie.

A further object of the present invention is to provide a method for reducing blood cholesterol in a patient in need of such treatment, comprising the administration to the patient of said psyllium-containing or said psyllium- and polyol polyester-containing cookie.

Yet a further object of the present invention is to provide a method for treating gastrointestinal disorders (such as constipation or diarrhea) in a patient in need of such treatment, comprising the administration to the patient of said psyllium-containing cookie.

SUMMARY OF THE INVENTION

The present invention relates to a method for making a psyllium-containing cookie dough which comprises the steps of:

(a) combining from about 3% to about 15%, by weight of the dough, of a liquid component selected from the group consisting of water, fresh egg and mixtures thereof, with from about 0.6% to about 35%, by weight of the dough, of a dry ingredient component selected from the group consisting of flour, sugar, non-pre-gelatinized starch, egg solids, protein solids, and mixtures thereof;

(b) combining from about 10% to about 35%, by weight of the dough, of a fluid shortening component with the mixture of (a); and (c) combining the mixture of (a) with from about 5% to about 30%, by weight of the dough, of a psyllium component, and other conventional cookie components to form said cookie dough.

The present invention also relates to a composition and method for making a psyllium- and polyol polyester-containing cookie.

The present invention further relates to methods for treating hypercholesterolemia and gastronintestinal disorders comprising oral administration of said cookies to a patient in need of such treatment.

DETAILED DESCRIPTION OF THE INVENTION

The present invention provides an effective method for incorporation of psyllium into a cookie composition. Most conventional cookie recipes are useful in the present invention, provided the specific procedure described herein for incorporation of psyllium is followed. Specifically, the flour and starch components must be manipulated; and the order in which the ingredients are combined must be altered, to allow for incorporation of the psyllium. Particularly useful are cookie compositions tending to be higher in fat and sugar. Especially preferred is a peanut butter cookie composition.

The psyllium used in the practice of this invention comes from psyllium seed, from plants of the Plantago genus. Various species, such as *Plantago lanceolate*, *P. rugelii*, and *P. major*, are known. Commercial psyllium includes the French (black; *Plantago indica*), Spanish (*P. psyllium*) and Indian (blond; *P. ovata*). The gum content of the psyllium varies: French psyllium, 11.8%; Indian psyllium, 30.9%; and German psyllium, 11.5%. Indian (blond) psyllium is preferred for use herein.

The psyllium gum (or "hydrophilic mucilloid") is located in the seed coat, from which it is readily extractable by water. Thus, intact or macerated seeds can be used in the practice of this invention; however, it is more typical to remove the seed coats from the rest of the seed by, for example, slight mechanical pressure, and then to use only the coats as a source of the gum. In the practice of the present invention it is convenient and typical to use macerated seed coats in the final formulation as the source of the psyllium gum. Preferably, the seed coats are not finely ground. From about 10% to about 35%, preferably from about 15% to about 30%, by weight of the cookie dough comprises psyllium.

The cookies of the present invention also comprise conventional cookie ingredients including, sugar, flour, shortening, egg and other conventional additives.

Ordinary granulated sugars are satisfactory for use in making the cookies of the present invention. These include sucrose, dextrose, maltose, fructose, brown and invert sugars, alone or in combination. The preferred sugars are brown sugar and granulated sucrose. Corn syrups may also be used as the sugar component of the present invention, however, the liquid component must be adjusted to compensate for the water in the syrup. Powdered sugars can also be used. The amount of sugar useful in the compositions of the present invention is at conventional cookie composition levels, generally from about 20% to about 50%, preferably from about 25% to about 40%, by weight of the cookie dough.

In the cookies described herein, psyllium cannot be used to simply substitute for the entire flour or starch component conventionally used in cookie compositions. If this were done, the result would be a crumbly cookie that would not stay in one piece. Furthermore, the psyllium generally cannot be added in addition to the typical ingredient levels for conventional cookie compositions. This would prevent inclusion of necessary levels of key cookie components. Thus, the cookies of the present composition are made with psyllium and a reduced level of flour.

The flour for use in making the cookies of the present invention may be any finely comminuted meal of any cereal grain or edible seed, or mixtures thereof, as are known by one skilled in the art of baking. Typical non-limiting examples include wheat flour, barley flour, rye flour, cornstarch and corn flour, triticale, and also the so-called synthetic flours, which incorporate such materials as starch and soy protein isolate, with or without heat and/or steam treatment. The wheat flours are most typically employed in baking. They consist of several types including hard red spring, hard red winter, soft red winter and white winter and spring. These flour types are distinguished by differences in gluten quality, water absorption and protein content. Protein in these flours can vary from about 7% to about 14%, with the soft wheat flours having protein contents at the lower end of that range and the hard winter wheat flours having protein contents at the upper end of that range. Preferably the flour used is a general-purpose wheat flour. The cookie dough of the present invention comprises from about 4% to about 25%, preferably from about 5% to about 20%, flour.

A starch source may be substituted for all or part of the flour. The starch can be any of the common food starches, for example, potato starch, corn starch, wheat starch, rice starch, barley starch, oat starch, tapioca starch, arrowroot, and sago starch. Modified starches can also be used. Preferably, the starch is pregelatinized, which helps to hold the baked cookie together, particularly at a reduced level of flour. Preferably, starch is substituted for from about 10% to about 50% of the flour component, thus comprising from about 1% to about 5% of the cookie dough composition.

The shortenings that can be employed in making the cookies of the present invention are well-known to those skilled in the art of baking and include solid or plastic, as well as liquid or semifluid, glyceride shortenings derived from animal, vegetable fats and oils including synthetically prepared shortenings. These glycerides can contain saturated or unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as corn oil, cottonseed oils, soybean oil, coconut oil, rapeseed oil, peanut oil, olive oil, palm oil, palm kernel oil, sunflower seed oil, safflower oil, lard, tallow and the like. These glycerides can also contain, in part, one or two short-chain acyl groups having from 2 to about 6 carbon atoms such as acetyl, propanoyl, valeryl, and caproyl; they can be prepared by random or low-temperature interesterification reactions of fatty triglyceride containing oils and fats such as interesterified or rearranged cottonseed oil and lard; and they can be otherwise formed by various organic syntheses.

Some preferred shortenings are soybean-based shortenings or oils, hydrogenated soybean-based shortening or oil, corn oil, palm oil, hydrogenated palm oil, lard and tallow oils. Of these, "Crisco" brand shortening or oil, which is soybean-based, is preferred. "Crisco" oil or shortening is commercially-available from The Procter & Gamble Company. It is preferred that the shortening used in the present invention be in fluid form, i.e., liquid at room temperature or melted, when added to the other ingredients. A shortening which may be useful in the present invention is that disclosed in U.S. application Ser. No. 722,533, Seiden, filed Apr. 12, 1985, now U.S. Pat. No. 4,664,921, which is incorporated by reference herein. This reference discloses a shortening which has a very low fat solids content. (If polyol polyesters are used in the present invention, this shortening preferably should not be used because of its low fat solids content.)

From about 10% to about 35%, preferably from about 15% to about 32%, by weight of the cookie dough comprises shortening.

Preferably, the shortening will contain an emulsifier which comprises from about 3% to about 30% of the shortening system. Suitable emulsifiers are lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof. Polyglycerol esters suitable for use in the present invention have an average of from about 2 to about 10 glycerol units and from 1 to 3 fatty acyl groups containing from about 14 to about 18 carbon atoms per glycerol moiety.

A preferred shortening/emulsifier system is that disclosed in U.S. Pat. No. 4,456,626, Nelson et al., issued June 26, 1984. The shortening disclosed therein contains an emulsifier consisting essentially of a hydrophilic polyglycerol monoester and a propylene glycol monoester, wherein the fatty acids used to esterify the polyglycerol ester and propylene glycol esters have from about $C_{16}$–$C_{22}$ carbon atoms, the ratio of propylene glycol monoester to polyglycerol ester being from 2:1 to 7:1. The remainder of the shortening system is fats, oils or hydrogenated fats and oil.

In a preferred embodiment of the cookie of the present invention, the shortening is replaced, completely or partly with a polyol polyester.

The nonabsorbable, nondigestible polyol polyesters (or, simply, polyesters) employed in this invention comprise certain polyols, especially sugars or sugar alcohols, esterified with a least four fatty acid groups. Accordingly, the polyol starting material must have at least four esterifiable hydroxyl groups. See e.g., U.S. Pat. No. 3,579,548, Whyte, issued May 18, 1971, incorporated herein by reference. Examples of preferred polyols are sugars, including monosaccharides and disaccharides, and sugar alcohols. Examples of monosaccharides containing four hydroxyl groups are xylose and arabinose and the sugar alcohol derived from xylose, which has five hydroxyl groups, i.e., xylitol. (The monosaccharide, erythrose, is not suitable in the practice of this invention since it only contains three hydroxyl groups; but the sugar alcohol derived from erythrose, i.e., erythritol, contains four hydroxyl groups and accordingly can be used.) Suitable five hydroxyl group-containing monosaccharides include galactose, fructose, and sorbose. Sugar alcohols containing six —OH groups derived from the hydrolysis products of sucrose, as well as glucose and sorbose, e.g., sorbitol, are also suitable. Examples of disaccharide polyols which can be used include maltose, lactose, and sucrose, all of which contain eight hydroxyl groups.

Preferred polyols for preparing the polyesters for use in the present invention are selected from the group consisting of erythritol, xylitol, sorbitol, glucose and sucrose. Sucrose is especially preferred.

The polyol starting material having at least four hydroxyl groups must be esterified on at least four of the —OH groups with a fatty acid containing from about 8 to about 22 carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic, and erucic acid. The fatty acids can be derived from naturally-occurring or synthetic fatty acids; they can be saturated or unsaturated, including positional and geometrical isomers, depending on the desired physical properties (e.g., liquid of a desired viscosity or solid) of the polyol fatty acid polyester compound being prepared.

Fatty acids per se or naturally-occurring fats and oils can serve as the source for the fatty acid component in the polyol fatty acid polyester. For example, rapeseed oil provides a good source of $C_{22}$ fatty acids. The $C_{16}$–$C_{18}$ fatty acids can be obtained from tallow, soybean oil, and cottonseed oil. Shorter chain fatty acids can be obtained from coconut, palm kernel, and babassu oils. Corn oil, lard oil, palm oil, peanut oil, safflower seed oil, sesame seed oil, and sunflower seed oil are examples of other natural oils which can serve as the source of the fatty acid used to prepare the polyesters herein.

Preferred fatty acids for preparing the polyol polyesters herein are the $C_{14}$ to $C_{18}$ acids, and are most preferably selected from the group consisting of myristic, palmitic, stearic, oleic, and linoleic fatty acids. Thus, natural fats and oils which have a high content of these fatty acids represent preferred sources for the fatty acid component, i.e., soybean oil, olive oil, cottonseed oil, corn oil, tallow and lard.

The polyol fatty acid polyesters useful in this invention must contain at least four fatty acid ester groups. Polyol fatty acid polyester compounds that contain three or less fatty acid ester groups are digested and the products of digestion are absorbed from the intestinal tract in much the same manner as with ordinary triglyceride fats, whereas the polyol fatty acid polyester compounds that contain four or more fatty acid ester groups are substantially nondigestible and consequently nonabsorbable by the human body. It is not necessary that all of the hydroxyl groups of the polyol be esterified with fatty acid, but it is preferred that the polyester contain no more than two unesterified hydroxyl groups. Most preferably, substantially all of the hydroxyl groups of the polyol are esterified with fatty acids, i.e., the compound is substantially completely esterified. The fatty acids esterified with the polyol molecule can be the same or mixed.

To illustrate the above points, a sucrose fatty triester would not be suitable for use herein because it does not contain the required four fatty acid ester groups. A sucrose tetra-fatty acid ester would be suitable, but is not preferred because it has more than two unesterified hydroxyl groups. A sucrose hexa-fatty acid ester would be preferred because it has no more than two unesterified hydroxyl groups. Highly preferred compounds in which all the hydroxyl groups are esterified with fatty acid include the sucrose octa-fatty acid esters.

In any given polyol fatty acid polyester compound, the fatty acid ester groups can be selected on the basis of the desired physical properties of the compound. For example, the polyol polyesters which contain unsaturated fatty acid ester groups and/or a preponderance of short chain, e.g., $C_{12}$, fatty acid ester groups are generally liquid at room temperature. The polyols esterified with longer chain and/or saturated fatty acid groups, such as stearoyl, are solids at room temperature.

The following ar nonlimiting examples of specific polyol fatty acid polyesters containing at least four fatty acid ester groups suitable for use in the present invention: glucose tetraoleate, glucose tetrastearate, the glucose tetraesters of soybean oil fatty acids, the mannose tetraesters of mixed tallow fatty acids, the galactose tetraesters of olive oil fatty acids, the arabinose tetraesters of cottonseed oil fatty acids, xylose tetralinoleate, galactose pentastearate, sorbitol tetraoleate, the sorbitol hexaesters of olive oil fatty acids, xylitol pentapalmitate, the xylitol tetraesters of substantially completely hydrogenated cottonseed oil fatty acids, sucrose tetrastearate, sucrose pentastearate, sucrose hexaoleate, sucrose octaoleate, the sucrose octaesters of partially or substantially completely hydrogenated soybean oil fatty acids and the sucrose octaesters of peanut oil fatty acids.

As noted above, highly preferred polyol fatty acid esters are those wherein the fatty acids contain from about 14 to about 18 carbon atoms and are thus derived from such natural materials as soybean oil and olive oil. Examples of such compounds are the erythritol tetraesters of olive oil fatty acids, erythritol tetraoleate, xylitol pentaoleate, sorbitol hexaoleate, sucrose octaoleate, and the sucrose hexa-, hepta- and octaesters of soybean oil fatty acids, partially or substantially wholly hydrogenated.

Generally, the sucrose polyester component used to prepare the cookie dough of the present invention comprises the product of an esterification reaction of a sucrose molecule with several different fatty acid salts or esters and is thus a mixture of several individual sucrose polyesters, each of which may include several different fatty acid moieties. Preferably at least 50% of the sucrose polyester component comprises octaesters, no greater than 10% comprises hexaesters, and the remainder comprises hepta-esters.

The polyol fatty acid polyesters suitable for use herein can be prepared by a variety of methods well-known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. As an example, the preparation of polyol fatty acid esters is described in U.S. Pat. No. 2,831,854, incorporated herein by reference. The most highly preferred methods of preparing the polyol polyesters used herein are disclosed in U.S. Pat. Nos. 3,963,699; 4,517,360 and 4,518,772, all incorporated herein by reference.

Specific, but nonlimiting, examples of the preparation of polyol fatty acid esters suitable for use in the practice of this invention are as follows.

Erythritol tetraoleate —Erythritol and a five-fold molar excess of methyl oleate are heated at 180° C., under vacuum, with agitation, in the presence of sodium methoxide catalyst over two reaction periods of several hours each. The reaction product (predominantly erythritol tetraoleate) is refined in petroleum ether and crystallized three times from several volumes of acetone at 1° C.

Xylitol pentaoleate—Xylitol and a five-fold molar excess of methyl oleate in dimethylacetamide (DMAC) solution are heated at 180° C. for five hours in the presence of sodium methoxide catalyst, under vacuum. During this time the DMAC is removed by distillation. The product (predominantly xylitol pentaoleate) is refined in petroleum ether solution and, after being freed of petroleum ether, is separated as a liquid layer four times from acetone at ca. 1° C. and twice from alcohol at ca. 10° C.

Sorbitol hexaoleate is prepared by essentially the same procedure used to prepare xylitol pentaoleate except the sorbitol is substituted for xylitol.

Sucrose octaoleate is prepared by substantially the same procedure as that used to prepare erythritol tetraoleate except that sucrose is substituted for erythritol.

From about 0% to about 100%, preferably from about 10% to about 100%, most preferably from about 50% to about 100%, by weight of the shortening component, i.e., from 0 to about 35%, preferably from about 10% to about 32%, by weight of the cookie dough, can comprise these polyol polyesters.

Fat-soluble vitamins can optionally be used to fortify the foregoing polyesters. It will be appreciated that commercial preparations of the appropriate vitamins and/or appropriate vitamin mixtures which provide vitamins A, D, E and K can be used herein. See U.S. Pat. No. 4,034,083, Mattson, issued July 5, 1977, incorporated by reference, for details of the role of these vitamins in metabolism and their use in combination with polyesters of the type used in this invention.

The amount of the individual fat-soluble vitamins used to fortify the present compositions can vary with the age of the recipient, the dosage regimen used, and the amount of the vitamin ingested from other dietary sources. For example, in younger, growing children or in pregnant females it is recognized that larger amounts of any given vitamin should be ingested to supply optimal nutritional benefits than are needed with adult males. If the user of the present compositions happens to ingest foods which are extremely rich in a given fat-soluble vitamin, less of that vitamin need be used in the present compositions to insure adequate intestinal uptake for good nutrition. In any event, an attending physician can, if so desired, measure the amount of fat-soluble vitamins in the plasma. Based on these data, the appropriate type and safe and effective amount of fat-soluble vitamin used to fortify the polyesters herein can then be determined on an individual basis.

More simply, the formulator of the compositions herein can fortify the polyesters with a recommended daily allowance (RDA), or increment or multiple of an RDA, of any of the fat-soluble vitamins to insure that the user of the compositions will maintain a nutritionally adequate uptake of said vitamins. For example, with vitamin A a daily amount in the range of 20 international units (I.U.) to about 57 I.U. per kilogram of body weight can be employed. With vitamin D, fortification of the compositions to provide about 400 I.U., total, per day is ample. When supplementing with vitamin E, the amount of the vitamin optimal for dietary intake ranges from 3–6 I.U. for infants to 25–30 I.U. total, per day for adults. When supplementing with vitamin K, it is more difficult to estimate the amount to be ingested to provide adequate nutrition since the microorganisms living in the intestine can synthesize this vitamin. However, it is known that ingestion of from 0.5 mg.–1 mg. of vitamin K per day will prevent insufficiency.

Anti-anal leakage agents may also optionally be used in combination with the polyesters to avoid undesirable anal leakage of the liquid polyesters. Though these agents may be used in the present invention, the combination of the polyesters with the psyllium may obviate the need for these anti-anal leakage agents. These agents may comprise edible $C_{12}$ and higher saturated fatty acids, and their edible salts; edible, digestible sources of $C_{12}$ and higher saturated fatty acids; edible, non-absorbable, non-digestible solid polyol fatty acid polyesters having at least 4 fatty acid ester groups, wherein the polyol is selected from the group consisting of sugars and sugar alcohols containing from 4 to 8 hydroxyl groups and wherein each fatty acid group has from about 8 to about 22 carbon atoms; and edible, non-digestible esters of alpha-branched chain $C_{10}$–$C_{18}$ fatty acids. Preferably, the anti-anal leakage agent is selected from the $C_{16}$–$C_{18}$ saturated fatty acids. A more detailed discussion of these agents can be found in U.S. Pat. No. 4,005,195, Jandacek, issued Jan. 5, 1977, herein incorporated by reference. If the anti-anal leakage agent is included in the compositions of the present invention, it is included at from about 1% to about 10% of the cookie dough composition.

Although eggs, or a suitable protein substitute, are not a critical ingredient of the cookies of the present invention, eggs are preferably included to impart flavor, richness and color to the cookies. Fresh whole eggs are preferred for making the cookies of the present invention. Alternatively, egg solids, particularly egg albumen and dried yolk, may be used in baking the products disclosed herein. Soy isolates, whey protein concentrates, or other egg substitutes may also be used herein in combination with, or in place of, the egg solids. Such substitutes are well-known to those skilled in the art of baking. From about 0% to about 15% by weight of the cookie dough, can comprise egg or egg substitute. When fresh whole egg is used, levels at the high end of this range are appropriate, whereas when dried egg solids are used lower levels are generally used.

The cookie dough of the present invention, as with conventional cookie dough, requires a liquid component. From about 3% to about 15%, by weight of the dough, comprises the liquid component added either via fresh egg (e.g., egg yolk, egg white, or whole egg), water, or a fresh egg plus water mixture. When fresh egg is used as the liquid component, it is generally included at from about 10% to about 15% of the dough. When water is utilized as the liquid component it is generally included at from about 3% to about 5% of the dough.

The liquid component it is generally included at from about 3% to about 5% of the dough. The "conventional additives" useful in making the cookies of the present invention include ingredients such as leavening agents, flavors, and flavor additives, colors, nutrients, antioxidants, and antimicrobial agents.

The chemical leavening agents can comprise a baking soda, e.g. sodium, potassium, or ammonium bicarbonate, and/or a baking acid, preferably sodium aluminum phosphate, monocalcium phosphate, dicalcium phosphate or mixtures thereof. The selection of the leavening system is within the knowledge of one skilled in the art. From 0% to about 2%, preferably from about 0.1% to about 2%, of the cookie dough of the present invention will typically be leavening agent.

The flavor additives can be of a type that remain as whole pieces in the cookie. Such additives include, but are not limited to, chocolate, peanut butter or butterscotch chips or chunks, fruit or fruit-flavored bits, such as blueberry, strawberry, or citrus flavored bits as disclosed in U.S. Pat. No. 3,794,741, Weigle, issued Feb. 26, 1974, which is herein incorporated by reference; or other fruit flavored bits, such as cherry, blackberry, apricot, raisin, date, or apple. Cereals may also be used, such as bran or oatmeal, as may nutmeats including the whole or chopped meat of any edible nut including walnuts, black walnuts, hickory nuts, hazel nuts, brazil nuts, peanuts, macadamia nuts, pecans, almonds, cashews, coconut and the like. From 0% to about 30% of the cookie dough can be such additives.

Other flavor additives may be incorporated into the cookie dough prior to baking to add flavor, aroma, and color to the final baked cookie. Examples, include spices, such as cinnamon, mace, nutmeg, caraway, anise, allspice, poppy seed, coriander, ginger, cloves, fennel, and salt; and flavorings, such as banana, orange, lemon, mint or vanilla, at levels up to about 10% of the cookie dough. Honey or molasses may also be used in the present invention at levels up to about 15%. Mixtures of these flavorings and whole piece components can be added to provide a variety of desirable products. Addition of peanut butter is preferred in preparing the cookie dough because the cookies of the present invention are well-suited to compositions with high oil contents. Up to about 30%, preferably from about 10% to about 25%, by weight of the cookie dough of the present invention comprises peanut butter. The exact amount added for any of these flavoring components (whether they are of the type that is blended into the composition or the type that remain as whole pieces) will depend on personal preference and on what particularly is being added.

Preferred cookies of the present invention comprise:
(a) from about 5% to about 30% of psyllium;
(b) from about 10% to about 35% of a shortening component comprising from about 10% to about 100% of a premelted, nondigestible, nonabsorbable polyol polyester;
(c) from about 25% to about 50% of a sugar component;
(d) from about 0% to about 30% of a flour component;
(e) from about 0% to about 30% of a starch component;
(f) from about 0% to about 15% of an egg component;
(g) the remainder being conventional cookie additives.

A particularly preferred cookie has the following composition:
(a) from about 8% to about 25% psyllium;
(b) from about 15% to about 35% of a polyol polyester selected from the group consisting of sucrose octaloeate, sucrose octalinoleate, sucrose octasterate, sucrose octapalmitate and mixtures thereof;
(c) from about 30% to about 45% of sucrose;
(d) from about 0% to about 15% of an all-purpose wheat flour;
(e) from about 1% to about 5% of pregelatinized starch;
(f) from about 0.1% to about 2% of dry egg white solids;
(g) the remainder being conventional cookie additives.

METHOD OF MAKING

Incorporating psyllium into a cookie involves more than just mixing the desired amount of psyllium into a conventional cookie composition. If psyllium is added this way, the psyllium will hydrate and result in a less palatable cookie. The present invention provides a method for incorporating the psyllium in a way that avoids hydration of the psyllium during the mixing, forming and baking of the cookie, thereby forming an aesthetically-appealing, more palatable psyllium-containing cookie.

The method of the present invention for making a psyllium-containing cookie comprises "tying-up" the water in the cookie dough system with part or all of the dry ingredient components in the dough, prior to mixing in the other cookie dough ingredients, particularly the psyllium. Mixing the dough in this way reduces the water availability in the cookie dough, thereby inhibiting hydration of the psyllium during the mixing and baking process. The dry ingredients which may be used to serve this function include sugar, flour, non-pregelatinized starch, egg solids, protein solids or mixtures thereof. All or part of these dry ingredients in the cookie may be used for this purpose. Those dry ingredients, or portions thereof, which are not used to tie-up the water may be added to the cookie dough at a later point in the mixing process.

The method of the present invention comprises a premixing step during which the liquid components of the dough (i.e., water, fresh egg or water plus fresh egg mixture) are mixed with the dry ingredient component selected from sugar, flour, non-pre-gelatinized starch, egg solids, protein solids, or mixtures thereof. It is preferred that the dry ingredients used in the premix step be selected from sugar, flour or mixtures thereof.

Preferably, the dry ingredient component that is premixed with the liquid component comprises part or all of the sugar used in the cookie dough. The sugar used in the pre-mix step comprises from about 10% to about 30% by weight of the dough. Utilization of the sugar in this pre-mixing step assures distribution of all of the cookie ingredients in the dough and additionally makes the dough easier to handle and form. Most preferably, the dry ingredient component is sucrose. As an alternative to actually mixing sugar with water in the premix step, it is possible to utilize a preformed mixture of sugar and liquid, as would be the case with honey or corn syrup. The use of these pre-formed mixtures is intended to fall within the present invention. Pre-gelatinized starch should not be included in the dry ingredient component of the premix (although it may be included in latter stages of the mixing) because it ties up the liquid component too tightly resulting in a less acceptable cookie.

The liquid component in this pre-mixing step comprises from about 3% to about 15% by weight of the dough. As described supra, the liquid component of the cookie dough may comprise water, fresh egg, or a mixture of water and fresh egg. The dry ingredient component in this pre-mixing step comprises from about 0.6% to about 35% by weight of the dough.

This premixture is then combined with a fluid shortening component, as described hereinbefore, in such an amount that the shortening component comprises from about 10% to about 35% by weight of the final cookie dough. If the shortening is not already in fluid form, it should be melted before it is combined with the premix. The inclusion of the shortening at this point in the process allows the cookie dough to be easily worked in conventional mixing equipment. Preferably the shortening comprises a hydrogenated soybean-based shortening.

The pre-mix/shortening mixture may then be combined with the other conventional cookie components and the psyllium to provide the cookie dough of the present invention. More specifically, this mixture is combined with from about 0% to about 2%, by weight of the dough, of a leavening component; from about 0% to about 5%, by weight of the dough, of pre-gelatinized starch; any remaining dry components (e.g., sugar, flour, non-pre-gelatinized starch, egg or protein solids) that were not pre-mixed with the water (it is possible, for example, to use part of the total sugar in the pre-mix step and add the remainder of the sugar at this point); from about 0% to about 30%, by weight of the dough, of peanut butter and/or other flavoring additives, and from about 5% to about 30%, by weight of the dough, of the psyllium component. Dry egg solids are, preferably, added to the cookie dough after the pre-mix step has been completed.

The order of mixing these additional components with the pre-mix/shortening mixture is not critical. However, to provide a dough which has even distribution of components and which is particularly easy to handle and form the components are combined as follows. The flour, non-pre-gelatinized starch, or protein (e.g., dry egg solids) not utilized in the liquid/dry ingredient pre-mixing step, the leavening agent, starch, and the psyllium are mixed together and then mixed in with the pre-mix/shortening mixture. Any remaining sugar not utilized in the liquid/dry ingredient premix is then mixed in. Finally, peanut butter or any other flavoring additives are added.

The cookie ingredients can be mixed using any conventional batch cookie mixing equipment, for example, a Hobart mixer.

Mixing the cookie ingredients in this way minimizes hydration of the psyllium in the mixing process. Combining the specified dry ingredients, especially sugar, with the liquid component, especially water, before combining with the psyllium minimizes the water availability so that the water does not hydrate the psyllium when the cookie ingredients are mixed. This enables the creation of a psyllium-containing cookie which has a texture similar to that of a conventional cookie. Furthermore, mixing the ingredients in this way slows undesireable hydration of the psyllium in the mouth upon eating. Thus, the cookies made by this method have taste and mouthfeel similar to conventional cookies.

A preferred method of making the cookie of the present invention includes the following steps:

(a) combining from about 3% to about 15%, by weight of the dough, of a liquid component selected from the group consisting of water, fresh egg, and mixtures thereof, with from about 10% to about 30%, by weight of the dough, of a sugar component;

(b) combining from about 10% to about 35%, by weight of the dough, of a fluid shortening component with the mixture of (a);

(c) mixing together from about 0% to about 30%, by weight of the dough, of a flour component, from about 0% to about 30%, by weight of the dough, of a starch component, from about 0.1% to about 2%, by weight of the dough, of a dry egg white component, and from about 5% to about 30%, by weight of the dough, of a psyllium component, and then combining this mixture with the mixture of (b).

From about 10 g to about 30 g portions of the cookie dough prepared by the present method are placed evenly spaced on a conventional baking sheet and baked using radiant, conductive or convective exposure to energy of a type which imparts thermal energy to the product being baked, such as conventional, convection, microwave or combinations thereof. Baking times and temperatures are dependent on the type of oven used. Generally, the cookies are baked at temperatures from about 300° F. (149° C.) to about 375° F. (190° C.) for from about 5 minutes to about 15 minutes.

The method of the present invention for making a psyllium and polyol polyester-containing cookie is basically the same as that for making the psyllium-containing cookie except that the shortening is replaced, in whole or in part, with the desired polyol polyester. The only difference in the method is that the polyol polyester (preferably sucrose octaoleate, sucrose octalinoleate, sucrose octapalmitate, sucrose octastearate, or mixtures thereof) must be melted before being added to the dry ingredient/liquid mixture. This allows for optimum distribution of the polyol polyester in the cookie dough.

METHOD OF TREATMENT

A treatment regimen of the present invention comprises oral administration to a patient in need of treatment to alleviate gastrointestinal disorders, such as irritable bowel syndrome, constipation or diarrhea, of a safe and effective amount of a cookie containing psyllium seed gum, or source thereof made according to the process of the present invention. By "safe and effective amount" is meant an amount sufficient to alleviate the gastrointestinal disorders but not so much as to cause any undesirable side-effects (e.g., excess laxation). Ingestion of a total of from about 5 g to about 15 g of psyllium material per day is appropriate in most circumstances to relieve these conditions. This can be accomplished by daily ingestion of from about 4 to about 8, preferably about 6, cookies each containing from about 1 g to about 5 g of the psyllium material. Preferably said ingestion is at two or three regularly spaced intervals throughout the day. This can vary somewhat with the size and condition of the patient. Such matters will, of course, be apparent to the attending physician. However, since the psyllium material is nontoxic and nonallergenic, even higher ingestion levels can be used without undue side effects, keeping in mind that excess psyllium can have a laxative effect.

If the patient suffers from chronic gastrointestinal disorders, including irritable bowel syndrome, constipation or diarrhea, chronic ingestion of from about 4 to about 8 cookies per day may be appropriate.

A second method of treatment aspect of the present invention comprises orally administering to a patient having hypercholesterolemia a safe and effective amount of a cookie (made as described herein) comprising either psyllium seed gum, or source thereof, or a combination of psyllium seed gum or source thereof, and a nonabsorbable, nondigestible polyol polyester of the type described hereinabove. By "safe and effective amount" is meant an amount sufficient to reduce blood cholesterol to normal levels but not so much as to cause any undesirable side effects (e.g., excess laxation or anal leakage). Ingestion of a daily total of from about 5 g to about 15 g of psyllium material, or ingestion of a daily total of from about 5 g to about 15 g of psyllium material and from about 10 g to about 30 g of the polyester material is appropriate in most circumstances. This can be accomplished by daily ingestion of from about 4 to about 8, preferably about 6, cookies each containing either from about 1 g to about 5 g of psyllium material, or from about 1 g to about 5 g of psyllium material and from about 3 g to about 15 g of the polyester material at two or three regularly spaced intervals throughout the day. This treatment regimen is continued until the condition is relieved. This can vary somewhat with the size and condition of the patient, and the patient's blood cholesterol level. Such matters will, of course, be apparent to the attending physician. However, since the psyllium material and the polyol material are nontoxic and nonallergenic, even higher ingestion levels can be used without undue side effects, keeping in mind that the materials herein do have a laxative effect.

In a preferred embodiment, to enhance ease of usage in a treatment regimen, the cookies are formulated such that they each contain a pharmaceutical unit dosage amount of the psyllium and/or polyol polyester components.

The preferred polyol polyesters used in the foregoing methods are: sucrose octaoleate, sucrose octalinoleate, sucrose octastearate, sucrose octapalmitate and mixtures thereof.

The following examples illustrate the present invention. It will be appreciated that other modifications of the present invention, within the skill of those in the baked food and pharmaceutical arts, can be undertaken without departing from the spirit and scope of this invention.

All percentages and ratios herein are by weight unless otherwise indicated.

EXAMPLE I

A peanut butter cookie containing psyllium is prepared as follows:

| Ingredient | Amount (g) |
| --- | --- |
| Brown Sugar | 85.00 |
| Water | 26.28 |
| Baking Soda | 3.00 |
| Salt | 1.00 |
| Shortening* | 120.00 |
| Flour** | 28.80 |
| Pregelatinized Starch*** | 14.00 |

-continued

| Ingredient | Amount (g) |
| --- | --- |
| Psyllium | 61.20 |
| Dry Egg White Solids | 3.72 |
| Baking Powder | 2.00 |
| Sucrose | 85.00 |
| Peanut Butter | 110.00 |

*Crisco Brand - available from The Procter & Gamble Company
**All purpose wheat flour, e.g., Gold Medal brand (General Mills)
***Tendergel 434 available from A. E. Staley Company The brown sugar, water, baking soda and salt are first combined using a Hobart mixer. The shortening is then combined with this premix composition. The flour, pregelatinized starch, psyllium, dry egg white solids and the baking powder are mixed together and then combined with the above ingredients. The sucrose is added and mixed in. Finally the peanut butter is mixed in. Fifteen gram portions of the cookie dough are then placed equidistant from each other on a baking sheet and baked in a Baker Perkins Mini-Rotel oven at 375° F. for about 13 minutes.

The result is a cookie which has the texture and taste of a conventional peanut butter cookie but which provides a means for introducing psyllium into the diet. Ingestion of six of these cookies per day, taken in portions of two cookies at three regularly spaced intervals throughout the day, can be used to reduce blood cholesterol level. Alternatively, this same regimen of ingestion of the cookie can also be used to treat gastrointestinal disorders in a patient in need of such treatment.

Similar results are obtained when the flour component, defined above, is included in the premix composition. Similar results are also obtained when fresh whole egg is used in the premix step in place of an equivalent amount of water and dry egg white solids.

Substantially similar results are obtained if the Crisco is replaced, in whole or in part, with corn oil, palm oil, hydrogenated palm oil, lard or tallow oil, or mixtures thereof.

Substantially similar results are obtained if the wheat flour of this example is replaced, in whole or in part, with a cake flour, a synthetic flour, triticale or oat flour, or mixtures thereof. Substantially similar results are also obtained if starch is substituted for all or part of the flour component. The pregelatinized starch may be replaced, in whole or in part, with potato starch, corn starch, wheat starch, rice starch, barley starch, oat starch, tapioca starch, arrowroot, or sago starch, or mixtures thereof. Substantially similar results are also obtained if the brown sugar or sucrose are replaced, in whole or in part, with dextrose, maltose, fructose, invert sugars, or corn syrups. Substantially similar results are also obtained if the peanut butter is replaced, in whole or in part, with flavored bits, nuts, bran, oatmeal, spices, vanilla extract, orange flavoring, or mint flavoring.

EXAMPLE II

A peanut butter cookie containing psyllium and sucrose polyester is prepared according to Example I, but the 120 grams of shortening is replaced with 120 grams of sucrose polyester (a mixture of sucrose hexa-, hepta- and octaesters of soybean oil fatty acids) which has first been melted. The result is a cookie which has the texture and taste of a conventional cookie but which is significantly lower in calories and which provides a means for introducing psyllium and sucrose polyester into the diet. Ingestion of six of these cookies per day, taken in portions of two cookies at three regularly spaced intervals throughout the day, can be used to reduce blood cholesterol levels.

132 mg of d-alpha-tocopherol acetate may be added to the above cookie dough to form a vitamin-supplemented version of the cookies.

Substantially similar results are obtained if the Crisco is replaced, in whole or in part, with corn oil, palm oil, hydrogenated palm oil, lard or tallow oil, or mixtures thereof.

Substantially similar results are obtained if the wheat flour of this example is replaced, in whole or in part, with a cake flour, a synthetic flour, triticale or oat flour, or mixtures thereof. Substantially similar results are also obtained if starch is substituted for all or part of the flour component. The pregelatinized starch may be replaced, in whole or in part, with potato starch, corn starch, wheat starch, rice starch, barley starch, oat starch, tapioca starch, arrowroot, or sago starch, or mixtures thereof. Substantially similar results are also obtained if the brown sugar or sucrose are replaced, in whole or in part, with dextrose, maltose, fructose, invert sugars, or corn syrups. Substantially similar results are also obtained if the peanut butter is replaced, in whole or in part, with flavored bits, nuts, bran, oatmeal, spices, vanilla extract, orange flavoring, or mint flavoring.

What is claimed is:

1. A cookie comprising:
    (a) from about 5% to about 30% of psyllium;
    (b) from about 10% to about 35% of a shortening component comprising from about 10% to about 100% of a premelted, nondigestible, nonabsorbable polyol polyester;
    (c) from about 25% to about 50% of a sugar component;
    (d) from 0% to about 30% of a flour component;
    (e) from 0% to about 30% of a starch component;
    (f) from 0% to about 15% of an egg component;
    (g) the remainder being conventional cookie additives.

2. The cookie of claim 1 wherein the shortening component comprises from about 50% to about 100% of the polyol polyester.

3. The cookie of claim 2 wherein the polyol polyester is selected from the group consisting of sucrose octaoleate, sucrose octalinoleate, sucrose octapalmitate, sucrose octastearate and mixtures thereof.

4. A cookie comprising:
    (a) from about 8% to about 25% of psyllium;
    (b) from about 15% to about 35% of a polyol polyester selected from the group consisting of sucrose octaoleate, sucrose octalinoleate, sucrose octastearate, sucrose octapalmitate and mixtures thereof;
    (c) from about 30% to about 45% of sucrose;
    (d) from about 0% to about 15% of an all-purpose wheat flour;
    (e) from about 1% to about 5% of pregelatinized starch;
    (f) from about 0.1% to about 2% of dry egg white solids;
    (g) the remainder being conventional cookie additives.

5. The method for reducing blood cholesterol levels in a patient in need of such treatment comprising orally administering to said patient a safe and effective amount of the cookie made according to claim 1.

6. The method for reducing blood cholesterol levels in a patient in need of such treatment comprising orally administering to said patient a safe and effective amount of the cookie made according to claim 3.

* * * * *